United States Patent

Keskitalo et al.

[11] Patent Number: 5,920,553
[45] Date of Patent: *Jul. 6, 1999

[54] DATA TRANSMISSION METHOD, BASE STATION EQUIPMENT AND MOBILE STATION

[75] Inventors: Ilkka Keskitalo; Risto Uola, both of Oulu, Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/682,658
[22] PCT Filed: Feb. 17, 1995
[86] PCT No.: PCT/FI95/00083
 § 371 Date: Jul. 29, 1996
 § 102(e) Date: Jul. 29, 1996
[87] PCT Pub. No.: WO95/24771
 PCT Pub. Date: Sep. 14, 1995

[30] Foreign Application Priority Data

Mar. 1, 1994 [FI] Finland ................................ 940981

[51] Int. Cl.$^6$ ............................................... H04J 13/00
[52] U.S. Cl. ...................................... 370/335; 370/342
[58] Field of Search .......................... 370/320, 322, 370/328, 329, 331, 332, 335, 342, 349, 469, 479, 470, 471, 473, 350; 455/436, 437, 439, 442, 444

[56] References Cited

U.S. PATENT DOCUMENTS 4,926,420  5/1990  Shimizu ................................ 370/471

FOREIGN PATENT DOCUMENTS

WO94/30024  12/1994  WIPO .

*Primary Examiner*—Chi H. Pham
*Assistant Examiner*—Kwang B. Yao
*Attorney, Agent, or Firm*—Pillsbury Madison & Sutro LLP

[57] ABSTRACT

A base station equipment, mobile station and data transmission method in a digital CDMA cellular radio network, in which base stations communicate with mobile stations located in an area. Each mobile station can have a duplex connection with more than one of the base stations simultaneously. Signals transmitted from more than one of the base stations can be combined in a respective mobile station. A signal received from a mobile station in more than one of the base stations can be combined in a base station controller. In the network, traffic channel transmission is carried out by using a predetermined frame structure. Cellular network frames of different types are transmitted between respective ones of the base stations and the mobile stations over radio paths. To simplify the structure of the base station equipment, the type of frame being transmitted is indicated by a predetermined frame identifier. If the frame identifiers of the frames received simultaneously via several paths are similar, the frames are combined, but if the frame identifiers are different, the frames are not combined.

15 Claims, 3 Drawing Sheets

DATA TRANSMISSION METHOD, BASE STATION EQUIPMENT AND MOBILE STATION

This application claims benefit of international application PCT/FI95/00083, filed Feb. 17, 1995.

BACKGROUND OF THE INVENTION

The present invention relates to a data transmission method in a digital CDMA cellular radio network, in which base stations communicate with the mobile station located in their area, in which a mobile station can have a duplex connection with more than one base station simultaneously; and in which signals transmitted from more than one base station can be combined in a mobile station; and in which a signal received from a mobile station in more than one base station can be combined in a base station controller, and in which network the traffic channel transmission is carried out by using a predetermined frame structure, and in which cellular network frames of different types are transmitted between a base station and mobile stations over the radio path.

CDMA is a multiple access method, which is based on the spread spectrum technology and which has been applied recently in cellular radio systems along with the earlier deployed FDMA and TDMA systems. CDMA has several advantages over the previous methods, such as spectral efficiency and the simplicity of frequency planning.

In a typical mobile telephone environment, the signals between a base station and a mobile station propagate along several paths between the transmitter and the receiver. This multipath propagation is primarily due to the reflection of the signal from the surrounding surfaces. Signals that have propagated along different paths arrive at the receiver at different times due to their different propagation delays. CDMA differs from the conventional FDMA and TDMA in that multipath propagation can be used in receiving a signal. The receiver generally used in the CDMA system is a so-called rake receiver, which consists of one or more rake branches. Each branch is an independent receiver unit, the function of which is to compose and demodulate one received signal component. Each rake branch can be adjusted to synchronize with a signal component propagated along an individual path, and in a conventional CDMA receiver, the signals of the receiver branches are preferably combined, a signal of good quality being thus achieved.

The signal components received by the branches of a CDMA receiver may be transmitted from one or more base stations. In the latter case, it is a question of so-called macrodiversity, i.e. a form of diversity by which the quality of the connection between a mobile station and a base station can be improved. In CDMA cellular radio networks, macrodiversity, which is also referred to by a term "soft handover", is used for ensuring the operation of power control in the fringe areas of base stations and for enabling smooth handovers.

In macrodiversity, a mobile station communicates with two or more base stations simultaneously. The same information is transmitted over all connections. The base stations do not establish independent signalling connections with the mobile station, but all signalling connections have to start from a common switching node. The reliability of the connection between a mobile station and a base station system is based on the combined reliability of several base station connections.

In the known CDMA systems, the combining of signalling messages and user data (speech or data signal) on a traffic channel must be similar over all macrodiversity connections. The traffic between different base stations and a mobile station must thus be identical over all connections. If this were not the case, the mobile station would not be able to combine different signals, and macrodiversity would not be benefited from at all. Therefore, the multiplexing and demultiplexing of signalling and the actual user data must take place in a common location according to the present-day methods.

In the case of a GSM-type network, this is illustrated by FIG. 1. The figure shows three base stations BTS1, BTS2 and BTS3, which are communicating with a mobile station MS. The signal received from the base stations is transmitted along lines 11a–11c to a base station controller BSC, in which the signalling information and the actual data are demultiplexed. The signalling is applied via a signalling unit 10 to the MSC along a separate line 13, and the speech is transmitted via a transcoder unit TRAU further to the MSC along a separate line 14. In this solution, the base stations are merely transmitter/receiver units without signal processing and intelligence. The units provided with intelligence are concentrated within the BTS, wherefore the BSC structure is complicated and difficult to implement. Lines 12a–12c represent signalling connections from the BSC to the base stations BTS1, BTS2, BTS3, the BSC being able to give commands to each BTS along these lines. The signalling transmitted via this path cannot, however, be applied further to the mobile station MS, as in the conventional GSM system, but the signalling intended for a mobile station must be applied via the TRAU unit in order that it can be multiplexed with the speech in a centralized manner. The CDMA-BSC implemented with the known methods would thus differ considerably from the base station controllers of the present-day GSM network.

SUMMARY OF THE INVENTION

The object of the present invention is thus to obviate the problems associated with the solution described above. With the use of the solution of the invention, it is ,for instance, possible to use GSM-type signalling between a base station and a base station controller in a GSM-type CDMA network. In a situation where macrodiversity is used, it is also possible to use only one base station for transmitting signalling information while the other base stations transmit user data only. The aim is to provide an arrangement in which the BTS attends to the multiplexing of speech and signalling, and the coding of the speech can be located in a more unrestricted manner in the network.

This is achieved with the data transmission method described in the foregoing, background section characterized in that in the frames to be transmitted, the type of frame concerned is indicated by a predetermined frame identifier, and, if the frame identifiers of the frames received simultaneously via several paths are similar, the frames are preferably combined, but if the frame identifiers are different, the frames are not combined.

The invention also relates to a base station equipment in a digital CDMA cellular radio network, this equipment comprising one or more base station transmitter units and a base station controller, which controls one or more base station transmitter units, which base station units communicate with the mobile stations located in their area; and in which network a mobile station can have a duplex connection with more than one base station transmitter unit simultaneously; and in which network signals transmitted from more than one base station unit can be combined in a mobile station; and which base station equipment comprises means for combining a signal received from a mobile station in more than one base station units; and in which network the traffic channel transmission is carried out by using a predetermined frame structure; and in which network frames of different types are randomly transmitted between the base station equipment and mobile stations over the radio path. The base station equipment of the invention is characterized in that the base station transmitter units comprise means for indicating the type of frame concerned by a predetermined frame identifier in the frame to be transmitted, and that the base station transmitter units comprise means for identifying the frame identifier of the frame transmitted from a mobile station.

The invention further relates to a mobile station, intended to be used in a digital CDMA cellular radio network, in which base stations communicate with the mobile stations located in their area, and in which network a mobile station can have a duplex connection with more than one base station transmitter unit simultaneously; and which mobile station comprises means (34) for combining signals transmitted from more than one base station; and in which network a signal received from a mobile station in more than one base stations can be combined in a base station controller; and in which network the traffic channel transmission is carried out by using a predetermined frame structure; and in which network frames of different types are randomly transmitted between a base station and mobile stations. The mobile station of the invention is characterized in that the mobile station comprises means for indicating the type of frame concerned by a predetermined frame identifier in the frame to be transmitted, and means for identifying the frame identifier of the frame transmitted from a base station, and means for combining the frames received simultaneously via several different paths if the frame identifier of the frames is the same.

The data transmission method of the invention can thus be applied in a digital cellular network, in which a predetermined frame structure is used on the traffic channel in bit transmission. This type of transmission based on frame structures is typical of digital data transmission. In the method of the invention, the frames to be transmitted include a certain bit or symbol sequence, which indicates the type of frame concerned. Frames of different types are indicated by different identifiers. Two or more types of these identifiers can be used, depending on how accurately the frames are to be distinguished from one another. In the simplest case, it is possible to use one bit, for instance, to indicate whether the frame contains signalling information. A signalling frame can contain conventional call control messages or other data, such as short messages.

BRIEF DESCRIPTION OF THE DRAWINGS

In the following, the invention will be described in more detail with reference to the examples according to the accompanying drawings, in which.

DETAILED DESCRIPTION

In the following, the invention will be described by using as an example a digital GSM cellular radio system, which has been modified by using the CDMA multiple access method on the radio path. However, the invention is not restricted to the GSM network but it can also be applied in other types of digital cellular radio networks applying CDMA. It is assumed that the cellular network is synchronized, i.e. that the base station clocks are in sync with one another.

Figure 2:
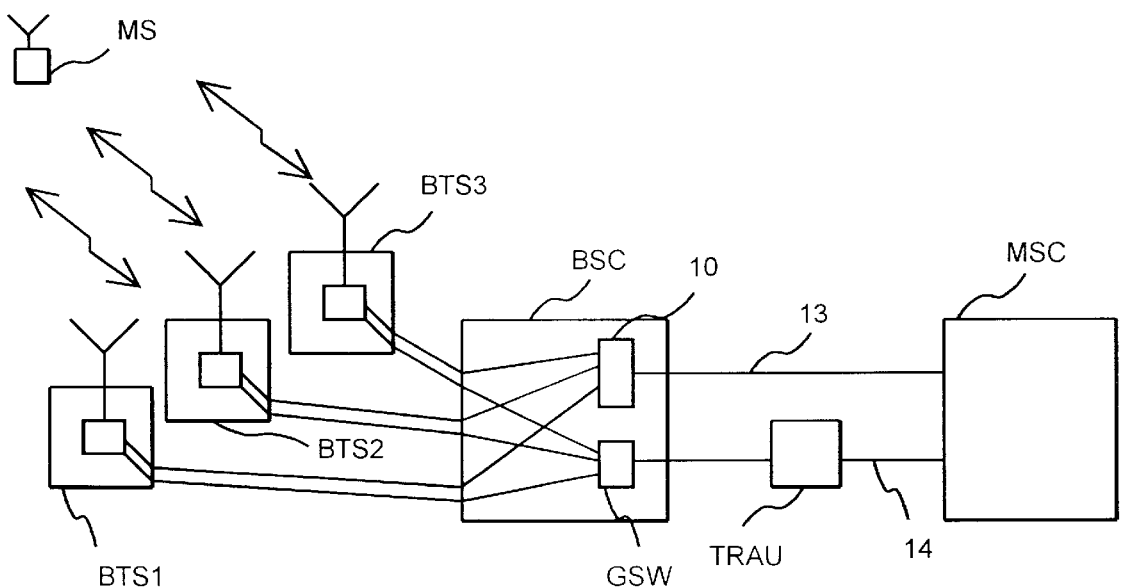
FIG. 2 shows a part of a GSM-type network, which uses CDMA and which applies the data transmission method of the invention.

The GSM base station system presently comprises three units, the functions of these units and the interfaces between them being clearly defined. These units are shown in FIG. 2. The base station unit BTS is assigned the radio path, it multiplexes speech and signalling, and monitors the quality of radio connections. The base station controller BSC monitors the use of resources (such as channels) and the signalling relating thereto. It also manages the communication between the BTS within its area. The transcoder unit TRAU attends to transcoding and speed adjustment for speech and data.

For the sake of example, assume that a message of the third OSI layer is transmitted via the base station controller BSC to the mobile station MS in a situation according to FIG. 2, where macrodiversity is used and where the mobile station MS communicates with more than one of the base stations BTS1, BTS2 and BTS3 simultaneously. Each base station communicates with the signalling controller 10 of the base station controller and with the transcoder unit TRAU via a group switch GSW. Each connection between a base station and the base station controller is independent. The signalling connection between the BSC and a BTS uses the LAPD protocol. The message of the third OSI layer transmitted by the MSC is transmitted to the base stations along two separate data links. The base stations can receive signalling frames from the signalling controller and speech frames from the TRAU at slightly different times even if they were transmitted simultaneously. Each base station multiplexes the signalling information and the user data by replacing a frame containing user data (for instance speech) by a signalling frame. Since the base stations operate independently, they may place a frame containing the same signalling information in places differing slightly from each other in the frame structure of the radio path.

Figure 3A:
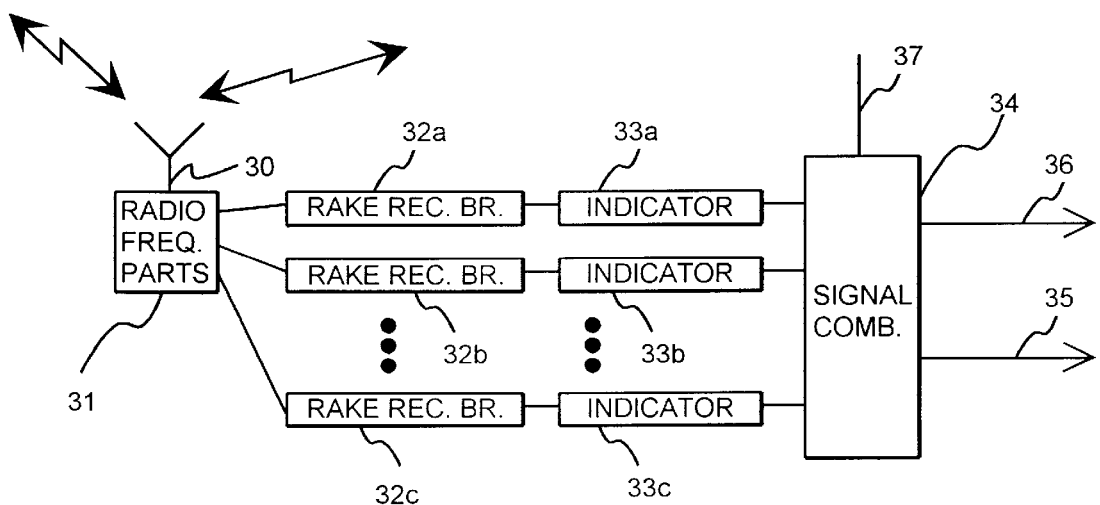
FIG. 3a shows a block diagram of the structure of the receiver side of the mobile station of the invention.

The mobile station receives signals from several base stations and combines them in a preferable manner. Macrodiversity reception can be implemented, for instance by using the rake receiver structure. FIG. 3a shows a block diagram of the structure of the transmitter side of the mobile station of the invention. The receiver comprises an antenna 30, radio frequency parts 31, several rake receiver branches 32a–32c, means 33a–33c for indicating the frame identifier, and means 34 for combining and selecting signals. Each rake receiver branch 32a–32c can be synchronized with a signal propagated along an individual path, this signal being transmitted by one or more base stations. The combining means can be controlled by means of a control signal 37 according to the upper layer protocol (LAPD-type link layer protocol).

Figure 4A:
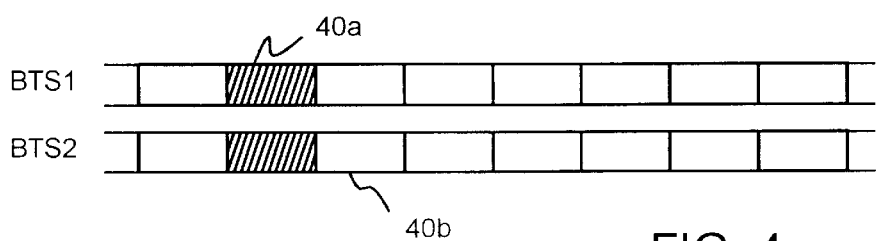
FIG. 4a illustrates, at the level of the traffic channel frame structure, a situation where the frames which are transmitted from base stations and which contain signalling arrive at a mobile station simultaneously.
Figure 4B:
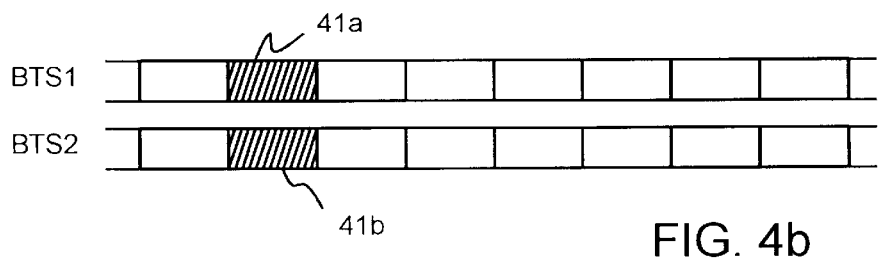
FIG. 4b illustrates, at the level of the traffic channel frame structure, a situation where the frames which are transmitted from base stations and which contain signalling arrive at a mobile station nonsimultaneously.

Due to the above-mentioned reasons, the receiver of the mobile station can receive different frames from the base stations simultaneously. This should be taken into account in the combining process. This situation is illustrated in FIGS. 4a and 4b. FIG. 4a shows the frames received by the mobile station from different base stations. The frame 40a, 40b containing signalling information is received in a different frame from different base stations. Since the frames are different, the information contained by them would be lost if the mobile station tried to combine them as such. In the method of the invention, a frame is provided with an identifier on the basis of which a mobile station can identify the type of the frame. The indication of the frame identifier must occur before the signal-combining block 34. The indication can be carried out, for instance by means provided in connection with each rake branch, these means detecting one of the predetermined bit sequences or symbols in the frame. Thus, if the combiner 34 of the mobile station observes that the frames received simultaneously at different branches are different, it will not try to combine them. The combiner of the receiver routes the frames to destinations in accordance with their frame identifiers. Speech frames are applied to the speech decoder and signalling frames to protocol layers, where the termination of the LAPDm protocol connection is.

The frames containing the same signalling information can thus arrive nonsimultaneously at the receiver. According to a preferred embodiment of the invention, if the frame received first is successfully decoded, the frame which arrives later and which contains the same information can be discarded as useless. This takes place on the basis of the link layer control via the control signal 37. Correspondingly, if the signalling frame arrived first at the receiver is found to be defective, it can be discarded on the basis of the link layer control when a second frame arrives.

The combining means 34 can be controlled from an upper link layer also in such a manner that priority is given to the frames of a certain base station. The priority can be based on the received signal strength, for instance.

Another advantage of the method of the invention is that if a mobile station receives at different times the frames which contain signalling information and which are transmitted by the base stations, the reception of user data is not interrupted because of the signalling, because the signalling frame and the data frame can be processed independently of each other at the same time. In a normal case, the transmission of a signalling frame requires the space of one data frame in the frame structure.

In a normal case, the frames received by each rake branch at the same time contain the same frame identifier. This situation is illustrated in FIG. 4b. The frame 41a, 41b containing signalling information is received in the same frame from different base stations. The normal diversity combining is thus possible, and the received frame is transmitted either to the speech decoder or protocol layers.

A frame identifier is similar to the so-called stealing flag used in the fast GSM signalling, but it can be implemented as either a bit, bit sequence, coded or uncoded symbol, depending on how much information is to be transmitted by it.

Figure 3B:
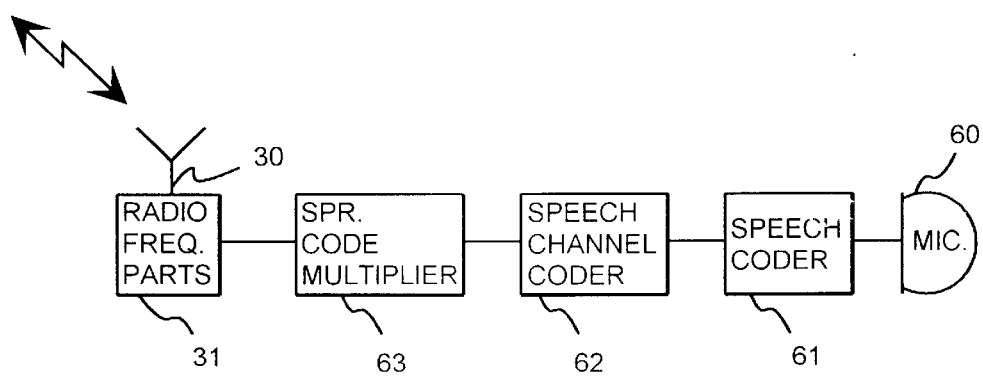
FIG. 3b shows a block diagram of the structure of the transmitter side of the mobile station of the invention.

In the other direction of transmission between the mobile station and a base station, the situation differs slightly from what has been described above. FIG. 3b shows a block diagram of the structure of the transmitter side of the mobile station of the invention. The transmitter comprises a microphone 60, means 61 for coding speech, means 62 for channel-coding speech, and means 63 for multiplying speech by a spreading code. After being multiplied by the spreading code, the signal is applied via the radio frequency parts 31 to the antenna 30. The transmitter also comprises other components, such as filters and converters, which are not essential as regards the invention and which are not included in the figure for the sake of clarity. The transmitter of the invention comprises means 62, in which the frame to be transmitted is provided with an identifier, on the basis of which the receiver of a base station can identify the type of frame concerned.

Figure 5A:
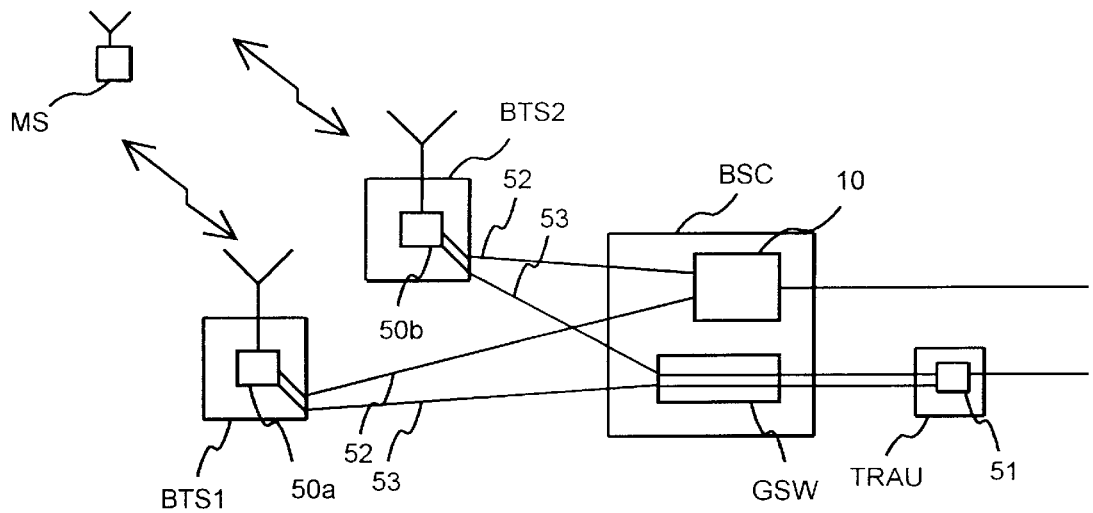
FIGS. 5a and 5b show in more detail a part of a GSM-type network, which uses CDMA and which applies the data transmission method of the invention.
Figure 5B:
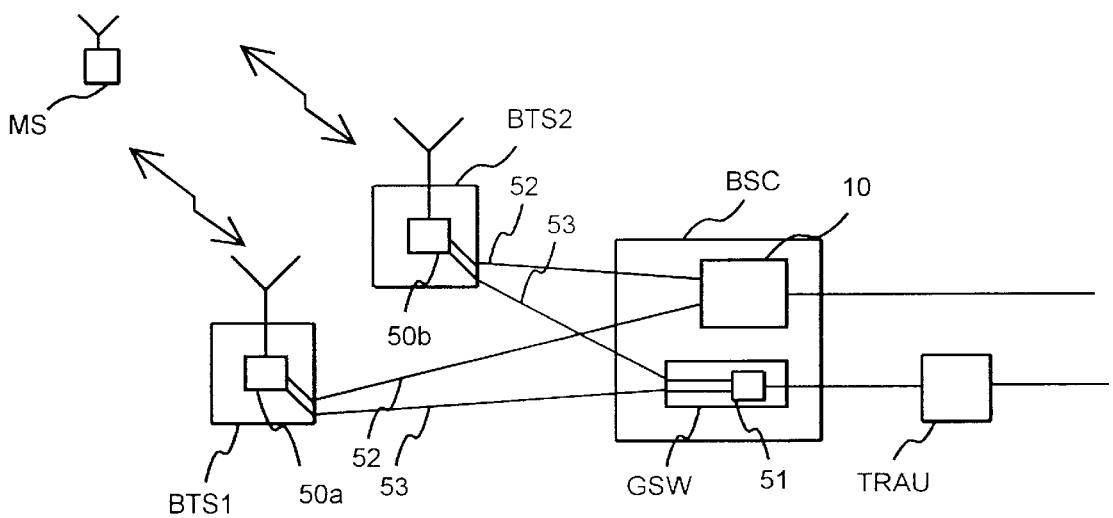

The diagrams of the base station equipment of the invention in FIGS. 5a and 5b illustrate the situation on the receiver side in this direction of transmission. In the figures, the mobile station MS transmits to two base stations BTS1, BTS2, which communicate with the base station controller BSC. In this situation, only one signal is transmitted from the mobile station, but it is received in more than one base station. There is thus only one signalling frame on the transmitter side, this signalling frame being transmitted in the place of a data frame, if need be. The base stations receive the signal independently, for instance by a rake receiver similar to the one used in the mobile station. The base station comprises means (50a, 50b) for indicating the frame identifier, on the basis of which it can separate the signalling information from the data. The user data is transmitted along a path 52 allocated for this use on the Abis interface to the base station controller BSC. As for the signalling, it is transmitted to the base station controller along a normal data link 53 by using the LAPD protocol.

In the base station equipment, the transcoder unit TRAU processes the user data separately from the signalling. Physically, the TRAU can be located separately from the base station controller. In the arrangement according to FIG. 5a, the TRAU comprises means 51 for combining the signals of the data frames transmitted from several base stations, whereas the signalling information is processed separately by the second OSI layer protocol. In the arrangement of FIG. 5b, the means 51 are located in the group switch GSW, and otherwise the arrangement is similar to the one in FIG. 5a. Since two separate data links exist for two different base stations BTS for signalling, the received signalling messages are combined on the basis of the message. For instance, if one signalling frame is lost over some MS-BTS connection, a corresponding message received over another MS-BTS connection can be used.

Figure 6:
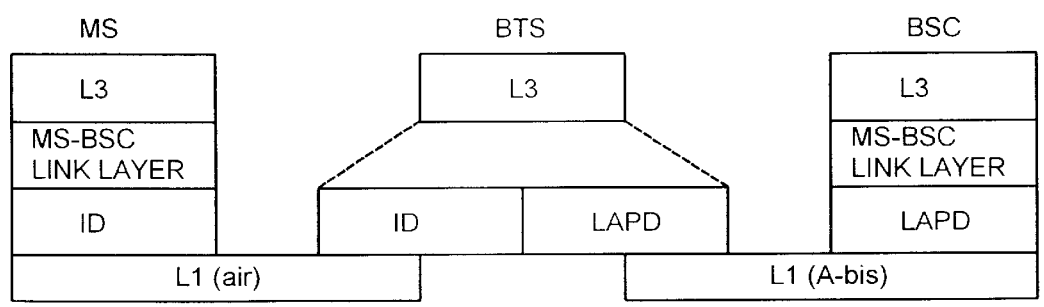
FIG. 6 shows a signalling diagram of a system applying the method of the invention.

FIG. 6 illustrates the method of the invention in a GSM-type network by means of a signalling diagram. The figure shows the signalling layers of the mobile station MS, the base station unit BTS and the base station controller. The traffic between the mobile station and the base stations takes place on the radio path in the layer L1, and the corresponding layer between the base stations and the base station controller takes place via a standardized Abis interface. In the upper level, the frame transmitted in the traffic between the mobile station and the base station is thus provided with a frame identifier (ID). The traffic between the base station and the base station controller takes place by means of the LAPD protocol. The termination (LINK LAYER) of the data link layer between the mobile station and the base station controller is located in the base station controller after the termination of the LAPD layer.

Figure 1:
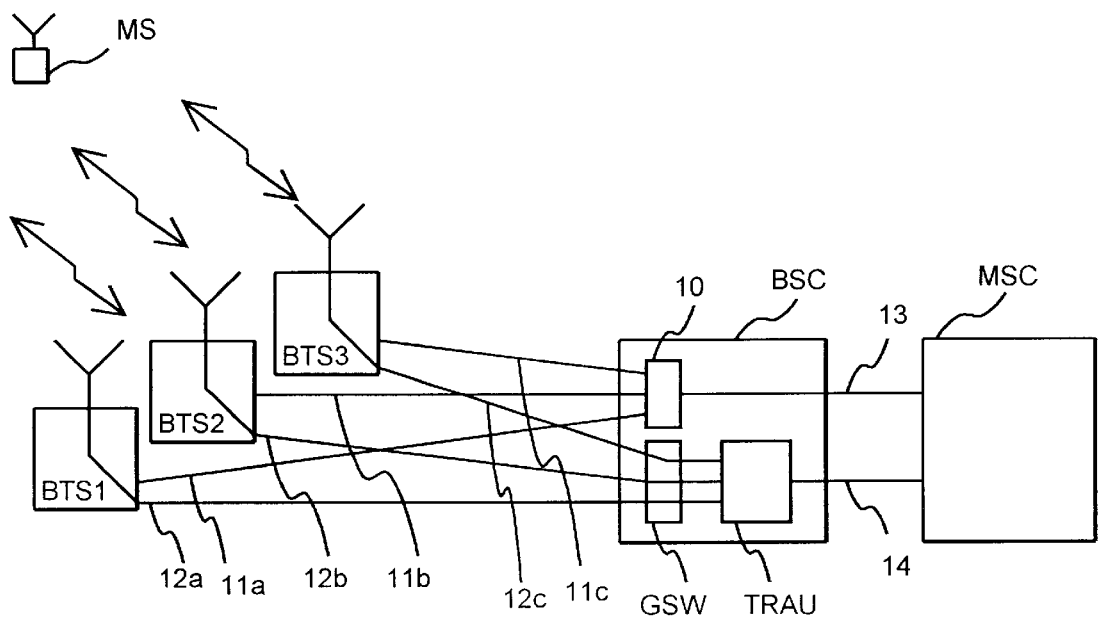
FIG. 1 shows the above-described part of a prior art GSM-type network using CDMA.

In the base station equipment of the invention, the components provided with intelligence can be located in a more unrestricted manner than has been possible in the prior art. For instance, the TRAU unit can be located outside the actual BSC. In addition, it is possible to locate speech coding in a more unrestricted manner than in the solution according to the prior art in FIG. 1. The speech frames arriving from different base stations can be combined in the TRAU, as described above, or the means 51 for combining can also be located in the group switch GSW, whereby the capacity of the fixed network can be saved when the TRAU is located near the MSC.

Even though the invention has been described above with reference to the examples according to the accompanying drawings, it is apparent that the invention is not so restricted but it can be modified in various ways within the inventive idea disclosed in the appended claims.

We claims:

1. A data transmission in a digital CDMA cellular radio network in which a plurality of base stations are arranged to communicate without a common time reference with a plurality of mobile stations located in an area, in which network a mobile station can have a duplex connection with more than one base station simultaneously, and in which network signals transmitted from more than one of said base stations can be combined in each respective mobile station which receives such signals, and in which network a signal received from a said mobile station in more than one of said base stations can be combined in a base station controller, and in which network traffic channel transmission is carried out by using a predetermined frame structure, and in which network frames of different types are transmitted between said base stations and said mobile stations over plural radio paths, said method comprising:

indicating for each frame so transmitted the type of frame by a predetermined frame identifier; and in connection with receiving said transmitted frames, reading the respective frame identifiers and if the frame identifiers of the frames received simultaneously via said plural paths are similar, combining respective ones of said frames, but if the frame identifiers are different, not combining respective ones of said frames.

2. The method according to claim 1, wherein:

each said frame identifier transmitted and read includes at least one bit allocated as a frame identifier in said frame structure.

3. The method according to claim 1, wherein:

each said frame identifier transmitted and read consists of a respective coded symbol.

4. The method according to claim 1, wherein:

some of said frames contain user data and others of said frames contain signalling information of a different type.

5. The method according to claim 4, further comprising:

when a said mobile station in connection with receiving said transmitted frames from more than one of said base stations and reading such frames applying to a speech coder those of the frames the frame identifiers of which indicate that they are data frames, and applying to respective protocol layers those of the frames the frame identifiers of which indicate that they are signalling frames.

6. The method according to claim 4, wherein:

when a said mobile station in connection with receiving said transmitted frames receives two or more respective frames containing the same information from more than one of said base stations at different times, accepting the first one of these respective frames which is successfully received at said base station, and discarding the respective frames which are received later and which contain the same information.

7. The method according to claim 5, further comprising:

in deciding a respective protocol layer, a decision is made concerning which connections the signalling frames arriving from which to apply to said protocol layers and which connections the frames arriving from which to discard.

8. The method according to claim 4, further comprising:

when a said base station in connection with receiving said transmitted frames from a said mobile station, said base station separating data frames and signalling frames from one another on the basis of said frame identifiers and transmitting the data and signalling frames separately to said base station controller using respective separate channels.

9. A base station equipment in a digital CDMA cellular radio network, comprising:

a plurality of base station units having respective transmitters and receivers; a base station controller, which is arranged to control said base station units;

said transmitters of said base station units being arranged to communicate, together with other base station equipment, with which said base station equipment does not have a common time reference, with mobile stations located in an area, each of which can have a duplex connection with the transmitters of more than one of said base station units simultaneously and can combine signals transmitted by the transmitters from more than one of said base station units;

means for combining a signal received from a mobile station in the receivers of a plurality of said base station units;

said transmitters being arranged to carry out traffic channel transmission using a predetermined frame structure;

said transmitters of said base station units each including means for indicating for each frame transmitted thereby the type of frame, by a predetermined frame identifier provided in the respective frame; and said receivers including means for identifying the frame identifiers of frames transmitted from mobile stations and received by said receivers, and means for combining the frames only if the frame identifiers are the same.

10. The equipment according to claim 9, wherein:

said transmitters are arranged to transmit and said receivers are arranged to receive frames of different types respectively containing user data and signalling data of a different type.

11. The equipment according to claim 10, wherein:

said means for combining a signal received from a mobile station in more than one of said base station units comprise separate means for combining user data and for combining signalling information.

12. The equipment according to claim 10, further comprising:

a transcoder unit; and wherein:

said means for combining user data received from a mobile station in more than one said base station units are located in said transcoder unit.

13. The equipment according to claim 9, further comprising:

a group switch; and wherein:

said means for combining user data received from a mobile station in more than one of said base station units are located in said group switch.

14. A mobile station arranged to be used in a digital CDMS cellular radio network in which a plurality of base stations without a common time reference communicate with mobile stations including said mobile station located in an area, comprising:

said mobile station being arranged to have a duplex connection with transmitters without a common time reference of more than one of said base stations units simultaneously;

means for combining signals transmitted from said transmitters without a common time reference of more than one of said base stations;

transmitting and receiving means arranged to carry out traffic channel transmission by using a predetermined frame structure;

means for providing in each frame being transmitted by said transmitting means an identifier indicating the type of frame, by a predetermined frame identifier;

means for identifying frame identifiers of respective frames transmitted from respective plural ones of said base stations and received by said receiving means; and means for combining frames received by said receiving means simultaneously via a plurality of paths if frame identifiers of the respective frames are identified by said identifying means as being the same.

15. The mobile station according to claim 14, wherein:

said means for combining are arranged to be controlled from upper signalling layers.

* * * * *